(12) United States Patent
Ozaki

(10) Patent No.: US 6,580,565 B2
(45) Date of Patent: Jun. 17, 2003

(54) ZOOM LENS SYSTEM

(75) Inventor: Hiroyasu Ozaki, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/025,612

(22) Filed: Dec. 26, 2001

(65) Prior Publication Data

US 2002/0118467 A1 Aug. 29, 2002

(30) Foreign Application Priority Data

Dec. 27, 2000 (JP) ........................................ 2000-397823

(51) Int. Cl.⁷ ................................................. G02B 15/16
(52) U.S. Cl. ........................................................ 359/687
(58) Field of Search ............................................ 359/687

(56) References Cited

U.S. PATENT DOCUMENTS

| | | | |
|---|---|---|---|
| 4,720,180 A | * 1/1988 | Asano et al. | 359/687 |
| 5,543,969 A | 8/1996 | Ito | 359/690 |
| 5,568,323 A | 10/1996 | Sensui | 359/689 |
| 5,912,771 A | 6/1999 | Ozaki et al. | 359/690 |
| 6,246,529 B1 | 6/2001 | Sensui | 359/680 |
| 6,317,271 B1 | 11/2001 | Sensui | 359/686 |
| 6,456,441 B2 | * 9/2002 | Hoshi | 359/687 |

* cited by examiner

Primary Examiner—Scott J. Sugarman
Assistant Examiner—Darryl J. Collins
(74) Attorney, Agent, or Firm—Greenblum & Bernstein, P.L.C.

(57) ABSTRACT

A zoom lens system includes a positive first lens group, a negative second lens group, a positive third lens group, and a positive fourth lens group. Upon zooming from the short focal length extremity to the long focal length extremity, at least the first, second and third lens groups are moved so that the distance between the first and the second lens groups increases, the distance between the second and the third lens groups decreases, and the distance between the third and the fourth lens groups increases.

5 Claims, 8 Drawing Sheets

1: 2.4

SPHERICAL ABERRATION

CHROMATIC ABERRATION

— d Line
······ g Line
- - - C Line

W= 31.9°

LATERAL CHROMATIC ABERRATION

W= 31.9°

ASTIGMATISM

— S
- - M

W= 31.9°

DISTORTION

Fig. 3
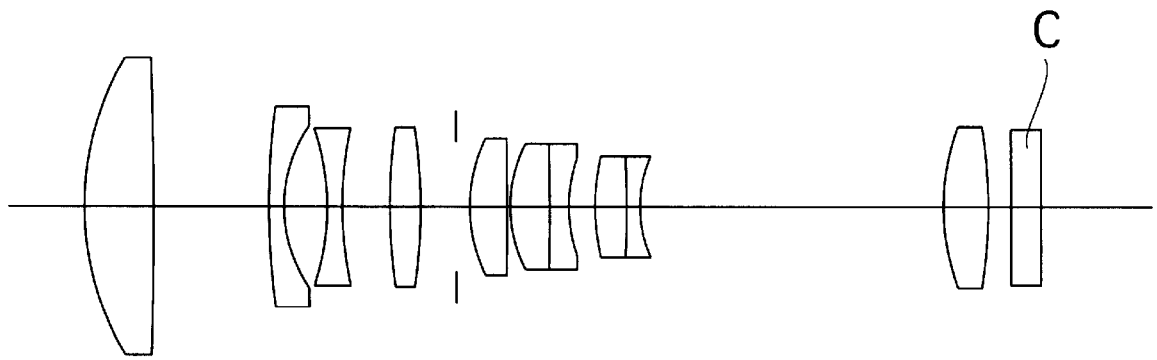
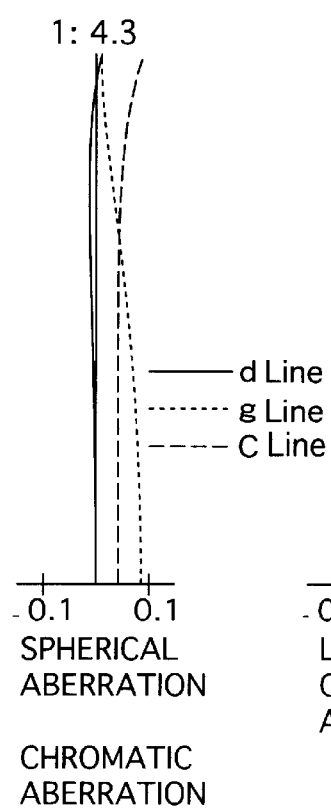
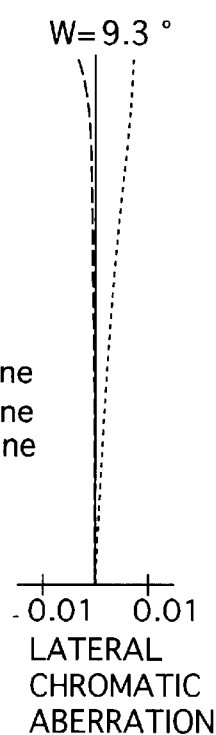
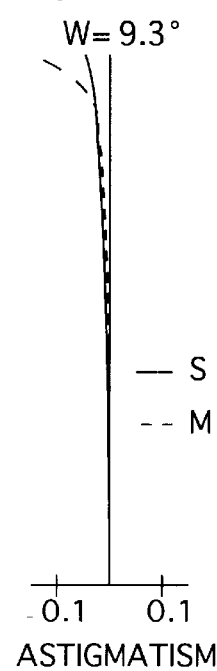
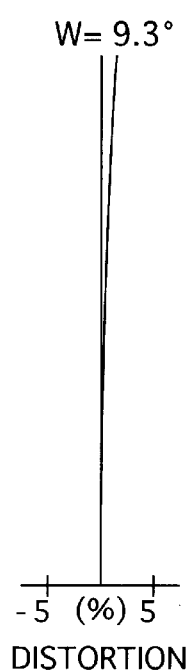

Fig. 5
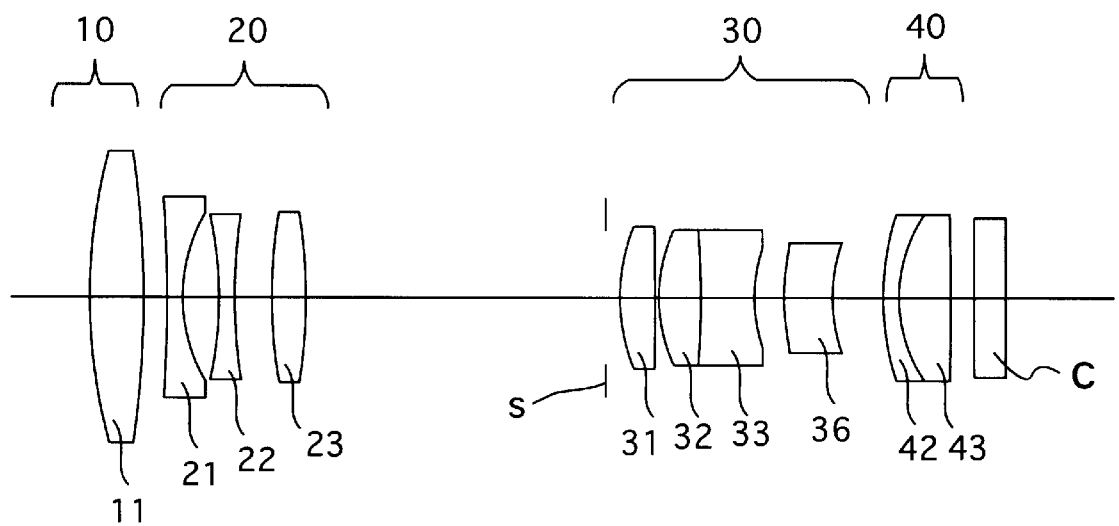
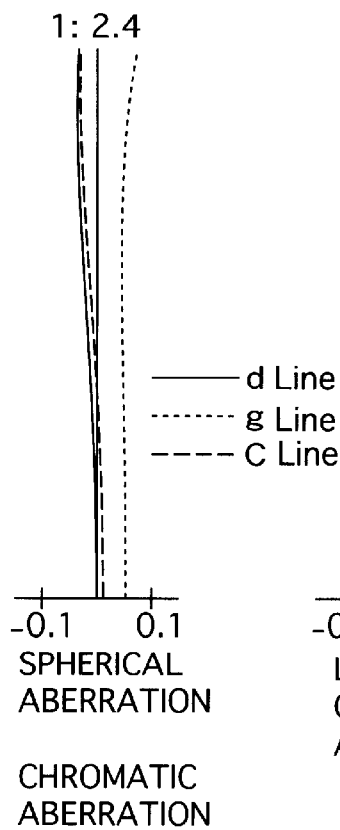
Fig.6A
1: 2.4
—— d Line
······ g Line
- - - C Line
-0.1  0.1
SPHERICAL
ABERRATION
CHROMATIC
ABERRATION
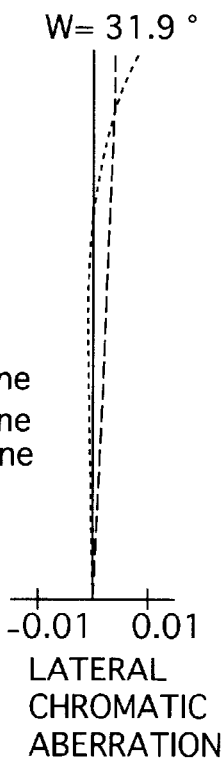
Fig.6B
W= 31.9°
-0.01  0.01
LATERAL
CHROMATIC
ABERRATION
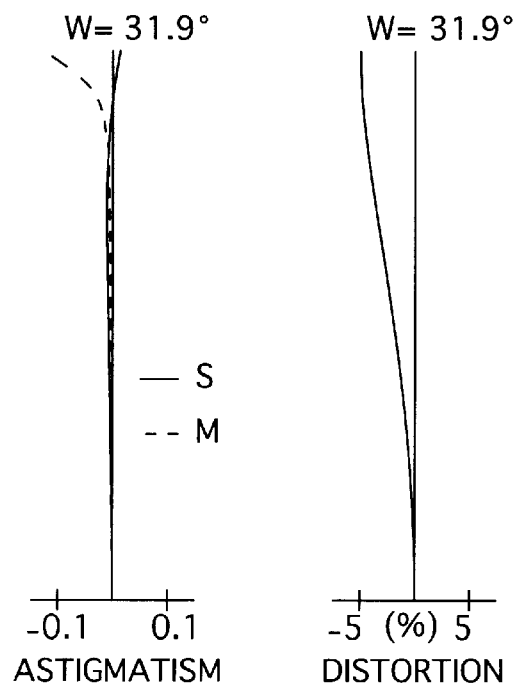
Fig.6C
W= 31.9°
—— S
- - M
-0.1  0.1
ASTIGMATISM
Fig.6D
W= 31.9°
-5 (%) 5
DISTORTION

1: 4.3

—— d Line
······· g Line
- - - - C Line

-0.1    0.1
SPHERICAL
ABERRATION

CHROMATIC
ABERRATION

W= 9.2°

-0.01   0.01
LATERAL
CHROMATIC
ABERRATION

W= 9.2°

— S
- - M

-0.1    0.1
ASTIGMATISM

W= 9.2°

-5  (%)  5
DISTORTION

SPHERICAL      LATERAL         ASTIGMATISM    DISTORTION
ABERRATION     CHROMATIC
               ABERRATION
CHROMATIC
ABERRATION

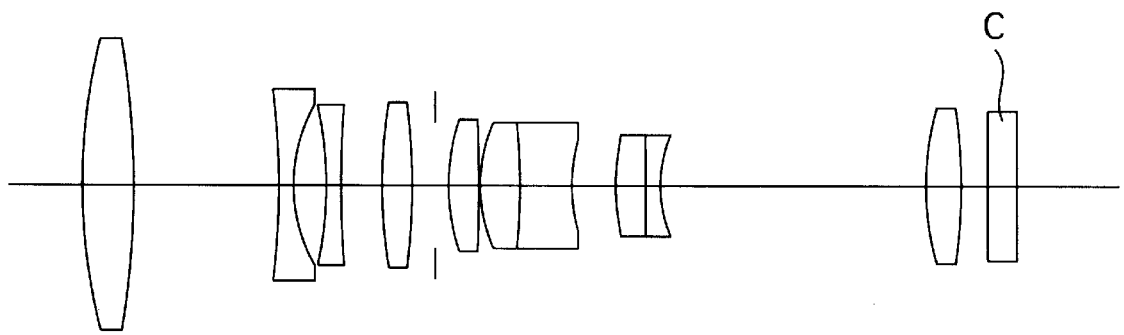

Fig.13
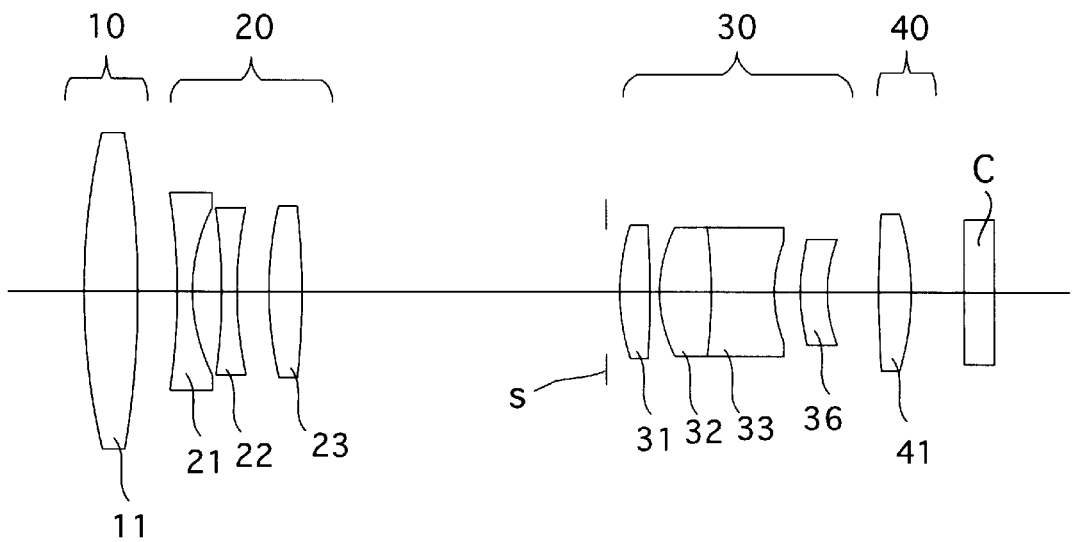
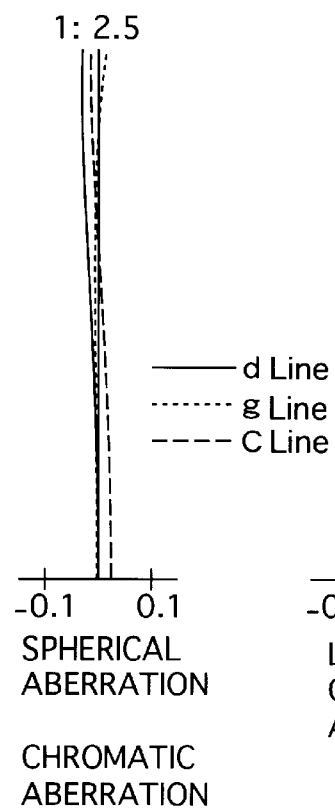
Fig.14A
1: 2.5
—— d Line
······ g Line
---- C Line
-0.1  0.1
SPHERICAL
ABERRATION
CHROMATIC
ABERRATION
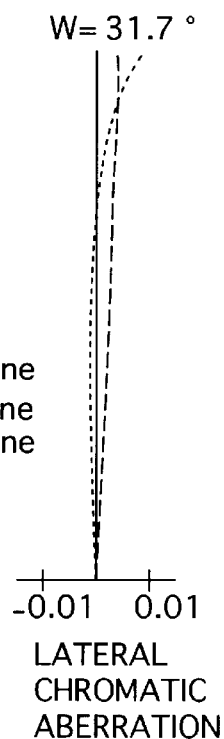
Fig.14B
W= 31.7°
-0.01  0.01
LATERAL
CHROMATIC
ABERRATION
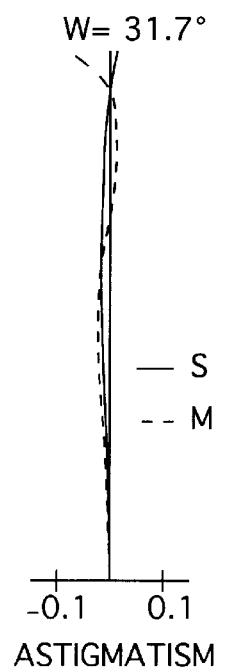
Fig.14C
W= 31.7°
—— S
-- M
-0.1  0.1
ASTIGMATISM
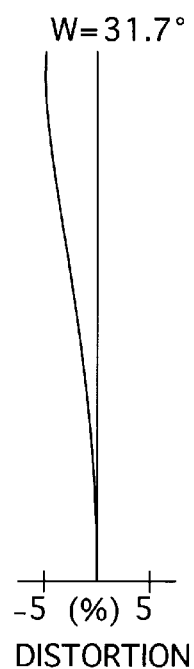
Fig.14D
W=31.7°
-5 (%) 5
DISTORTION Fig.15
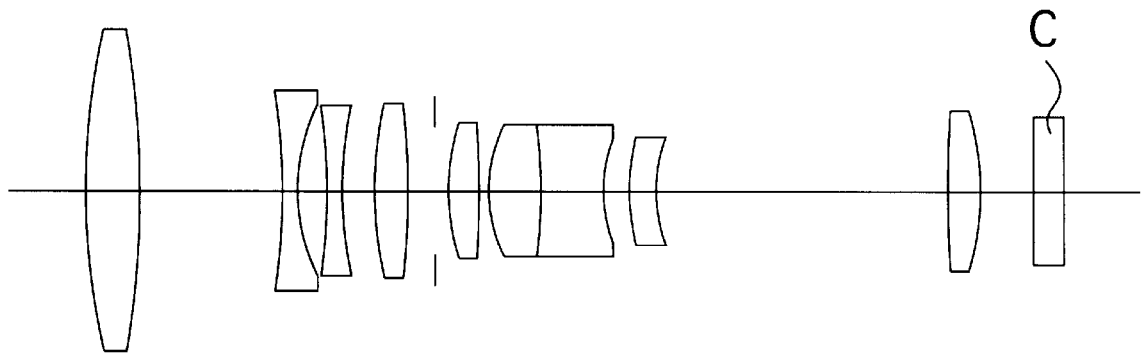
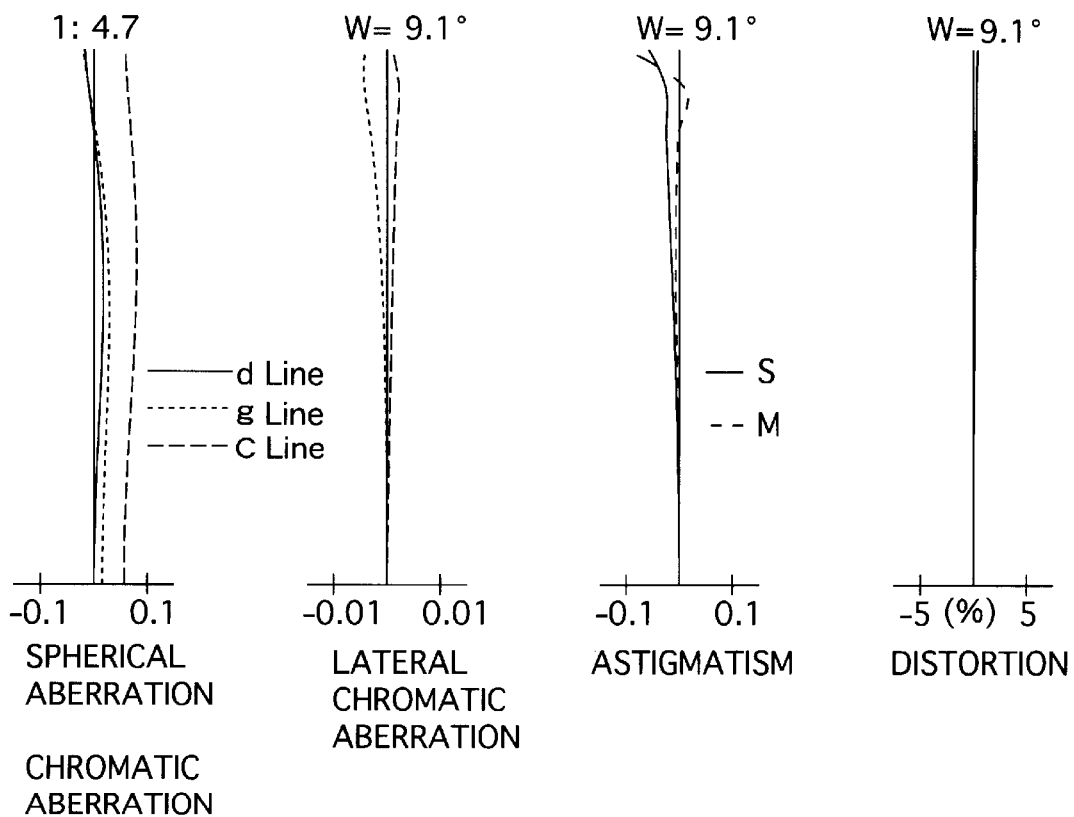
Fig.16A    Fig.16B    Fig.16C    Fig.16D

ZOOM LENS SYSTEM

BACKGROUND OF THE INVENTION

1. Field of the Invention

The present invention relates to a zoom lens system for a digital still camera or a video camera, and in particular, relates to a miniaturized and high-performance zoom lens system having a zoom ratio of about 3.6.

2. Description of the Prior Art

As to a zoom lens system, a retro-focus lens system including a negative lens group and a positive lens group, in this order from the object, is easy to be constituted; however, the zoom ratio is limited to about 3. Unlike the above-explained retro-focus lens system, a four-lens-group zoom lens system including a positive lens group, a negative lens group, a negative lens group and a positive lens group, in this order from the object, has been known as a lens system which can increase the zoom ratio. On the other hand, in a four-lens-group arrangement, the number of lens elements thereof becomes larger, and the first lens group having a large diameter is used as a focusing lens group. As a result, the overall length of the lens system has to become longer, and such an arrangement is disadvantageous for a lens system with a function of automatic focusing.

Generally, with respect to size and optical performance (zoom ratio), a three-lens-group zoom lens system having a positive lens group, a negative lens group and a positive lens group, in this order from the object, is classified between a two-lens-group lens system and a four-lens-group lens system. In particular, a three-lens-group lens system which is disclosed in U.S. Pat. No. 5,912,771 filed by the applicant of the present invention has attained a zoom ratio of 3, while miniaturization and high-performance of the lens system have been attained. More concretely, in this three-lens-group zoom lens system, the first lens group is made immovable, and zooming is performed by the second and third lens groups.

SUMMARY OF THE INVENTION

It is an object of the present invention to provide a miniaturized and high-performance four-lens-group zoom lens system for a digital still camera or a video camera, the lens system of which can attain a zoom ratio of about 3.6, while the size of the lens system and the number of lens elements thereof are substantially the same as those of a three-lens-group zoom lens system.

In order to achieve the above-mentioned object, there is provided a zoom lens system including a positive powered (hereinafter, positive) first lens group, a negative powered (hereinafter, negative) second lens group, a positive third lens group, and a positive fourth lens group, in this order from the object. Upon zooming from the short focal length extremity to the long focal length extremity, at least the first, second and third lens groups are moved so that the distance between the first lens group and the second lens group increases, the distance between the second lens group and the third lens group decreases, and the distance between the third lens group and the fourth lens group increases. The lens system satisfies the following conditions:

$$0.10 < fw/f1 < 0.30 \quad (1)$$

$$0.25 < fw/f4 < 0.45 \quad (2)$$

$$0.60 < X3/(ft-fw) < 0.85 \quad (3)$$

wherein fw designates the focal length of the entire zoom lens system at the short focal length extremity;

ft designates the focal length of the entire zoom lens system at the long focal length extremity;

fi designates the focal length of the $i^{th}$ lens group (i=1 to 4); and

X3 designates the traveling distance of the third lens group from the short focal length extremity to the long focal length extremity.

The first lens group can be constituted by a positive single lens element only. With this arrangement, the zoom lens system satisfies the following condition:

$$0.20 < (d2t-d2w)/(ft-fw) < 0.50 \quad (4)$$

wherein d2w designates the distance between the first lens group and the second lens group at the short focal length extremity; and d2t designates the distance between the first lens group and the second lens group at the long focal length extremity.

The fourth lens group can be constituted by a positive single lens element only, and can function as a focusing lens group. With this arrangement, the fourth lens group satisfies the following condition:

$$0.6 < ft/ft_{1-3} < 0.8 \quad (5)$$

wherein $ft_{1-3}$ designates the focal lengths from the first lens group to the third lens group, at the long focal length extremity.

The fourth lens group can be movable upon zooming. On the other hand, if the fourth lens group is made immovable, the mechanical structure of a lens barrel can be simplified.

The present disclosure relates to subject matter contained in Japanese Patent Application No. 2000-397823 (filed on Dec. 27, 2000) which is expressly incorporated herein in its entirety.

BRIEF DESCRIPTION OF THE DRAWINGS

The invention will be discussed below in detail with reference to the accompanying drawings, in which:

FIG. 3 shows the lens arrangement of the zoom lens system at the long focal length extremity, according to the first embodiment of the present invention;

FIGS. 4A, 4B, 4C and 4D show aberrations occurred in the lens arrangement shown in FIG. 3;

FIG. 5 shows a lens arrangement of a zoom lens system at the short focal length extremity, according to a second embodiment of the present invention;

FIGS. 6A, 6B, 6C and 6D show aberrations occurred in the lens arrangement shown in FIG. 5;

FIG. 11 shows the lens arrangement of the zoom lens system at the long focal length extremity, according to the third embodiment of the present invention;

FIGS. 12A, 12B, 12C and 12D show aberrations occurred in the lens arrangement shown in FIG. 11;

FIG. 13 shows a lens arrangement of a zoom lens system at the short focal length extremity, according to a fourth embodiment of the present invention;

FIGS. 14A, 14B, 14C and 14D show aberrations occurred in the lens arrangement shown in FIG. 13;

FIG. 15 shows the lens arrangement of the zoom lens system at the long focal length extremity, according to the fourth embodiment of the present invention; and FIGS. 16A, 16B, 16C and 16D show aberrations occurred in the lens arrangement shown in FIG. 15.

DESCRIPTION OF THE PREFERRED EMBODIMENTS

Figure 1:
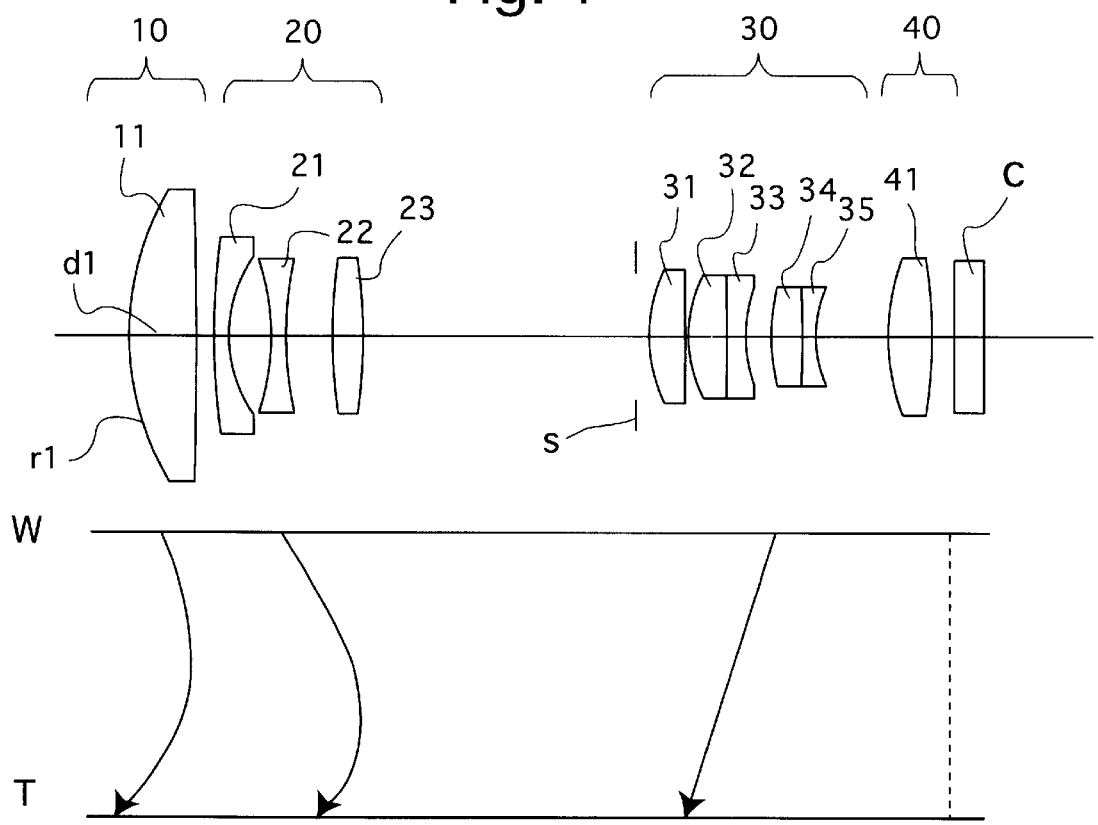
FIG. 1 shows a lens arrangement of a zoom lens system at the short focal length extremity, according to a first embodiment of the present invention.
Figure 2A:
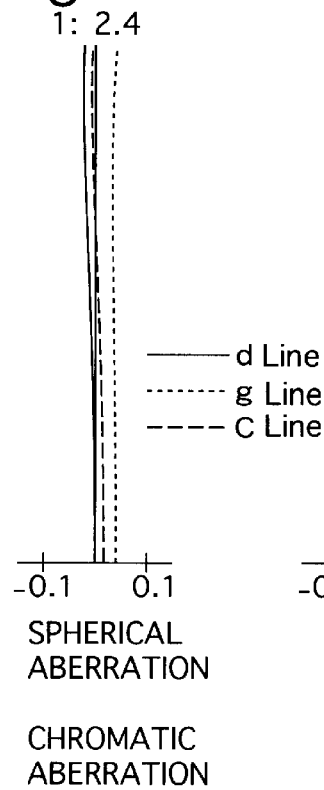
FIGS. 2A, 2B, 2C and 2D show aberrations occurred in the lens arrangement shown in FIG. 1.
Figure 2B:
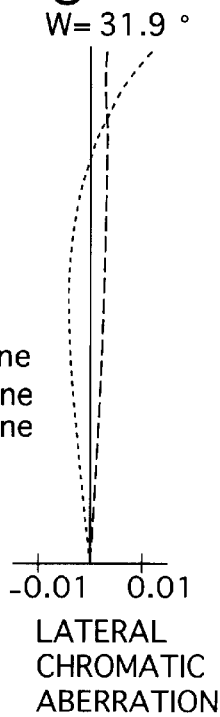
Figure 2C:
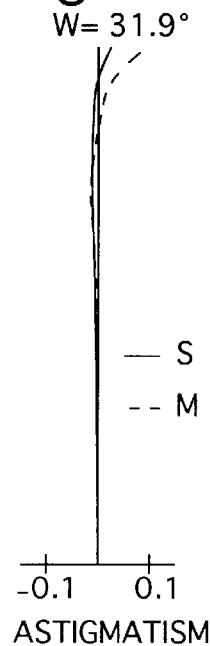
Figure 2D:
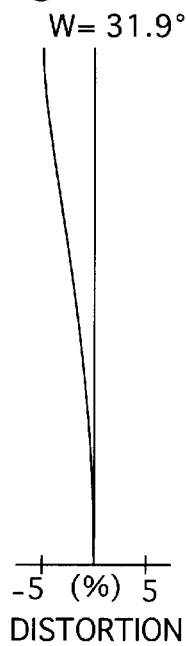
Figure 9:
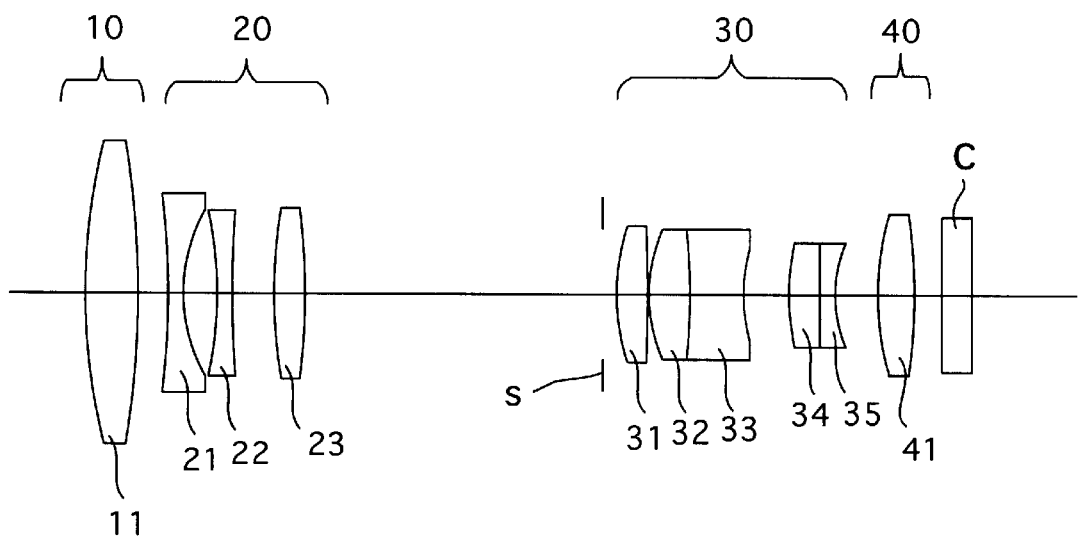
FIG. 9 shows a lens arrangement of a zoom lens system at the short focal length extremity, according to a third embodiment of the present invention.
Figures 10A, 10B, 10C, 10D:
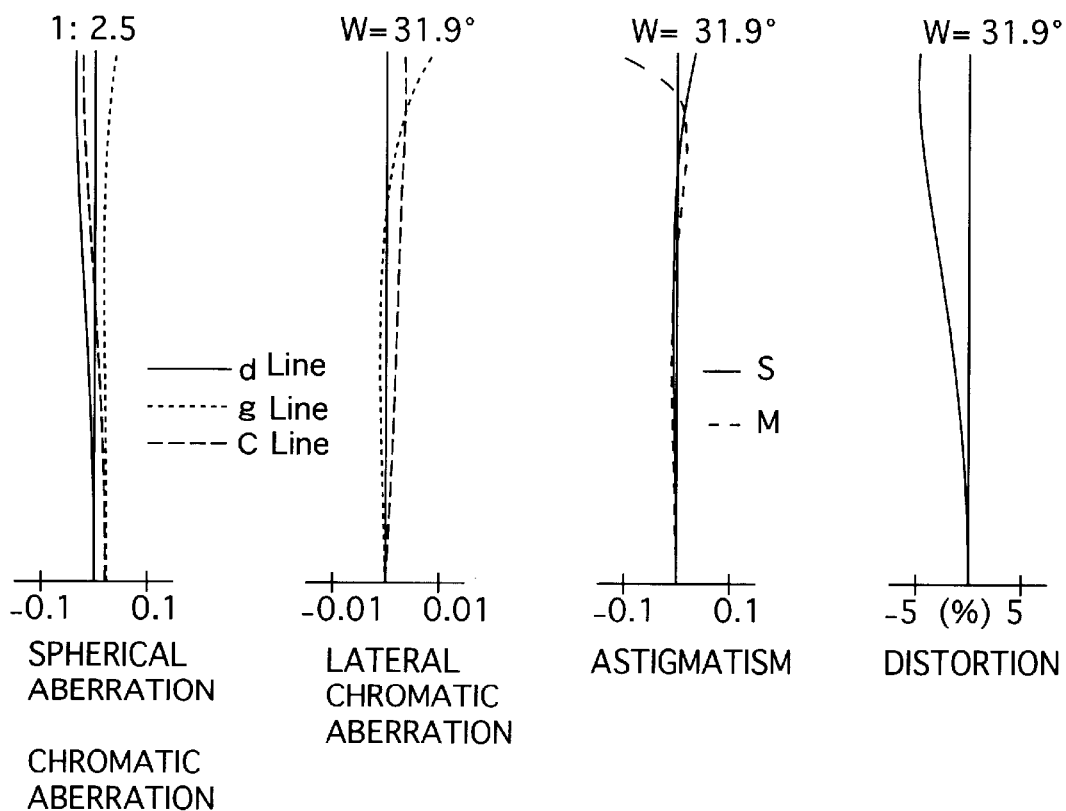
FIGS. 10A, 10B, 10C and 10D show aberrations occurred in the lens arrangement shown in FIG. 9.

As shown in FIG. 1 (first embodiment), FIG. 5 (second embodiment), FIG. 9 (third embodiment), and FIG. 13 (fourth embodiment), the zoom lens system of the present invention includes a positive first lens group 10, a negative second lens group 20, a positive third lens group 30, and a positive fourth lens group 40, in this order from the object. As shown in the lens-group moving paths in FIG. 1, these four lens groups move in the optical axis direction upon zooming. More specifically, upon zooming from the short focal length extremity to the long focal length extremity, the first lens group 10 and the second lens group 20 first move toward the image and thereafter move toward the object; the third lens group 30 moves toward the object; and the fourth lens group 40 is made immovable. As an alternative, an embodiment in which the fourth lens group 40 is movable can be possible. Except the fourth lens group 40 of the second embodiment, each of the first lens group 10 and the fourth lens group 40 is constituted by a single positive lens element. According to this arrangement, the number of lens elements in the entire zoom lens system can be the same as that of a three-lens-group zoom lens system. On the other hand, the fourth lens group 40 of the second embodiment is constituted by two lens elements. Throughout the embodiments, the fourth lens group 40 is a focusing lens group. Due to this arrangement, the zoom lens system can be miniaturized and a function of automatic focusing can be advantageously provided therein, since the fourth lens group 40 is the most image-side and lightweight lens group, and the size thereof is smallest, among the four lens groups. A diaphragm S is supported in front of the third lens group 30 so that the diaphragm S integrally moves with the third lens group 30. A cover glass C for an image pick-up device (not shown) is provided behind the fourth lens group 40. The second surface of the cover glass C is coincident with the surface of the image pick-up device.

Condition (1) specifies the optical power (hereinafter, power) of the first lens group 10.

If fw/f1 exceeds the lower limit of condition (1), the power of the first lens group 10 becomes too weak, so that
a necessary magnification effect upon zooming cannot be achieved, or the traveling distance of the first lens group 10 upon zooming becomes longer, which is disadvantageous for miniaturization of the lens system.

If fw/f1 exceeds the upper limit of condition (1), the power of the first lens group 10 becomes too strong, so that aberrations, such as coma and astigmatism, becomes larger. As a result, the correcting of aberrations in a well balanced manner is difficult.

Condition (2) specifies the power of the fourth lens group 40.

If fw/f4 exceeds the lower limit of condition (2), the positive power of the fourth lens group 40 becomes weaker, so that the angle-of-incidence of light rays emitted from the fourth lens group 40 to the image-forming plane (the image forming surface of the image pick-up device) becomes larger. In other words, telecentricity worsens.

If fw/f4 exceeds the upper limit of condition (2), the positive power of the fourth lens group 40 becomes too strong, so that such strong power may cause coma and astigmatism. Furthermore, the traveling distance of the third lens group 30 becomes longer, so that the overall length of the lens system cannot be shortened.

Condition (3) specifies the traveling distance of the third lens group 30.

If X3/(ft−fw) exceeds the lower limit of condition (3), the traveling distance of the third lens group 30 becomes shorter, which is advantageous for miniaturization of the lens system. However, the power of the third lens group 30 becomes stronger, so that fluctuations of aberrations become larger.

If X3/(ft−fw) exceeds the upper limit of condition (3), the traveling distance of the third lens group 30 becomes longer, so that the distance between the second lens group 20 and the third lens group 30 has to be secured longer at the short focal length extremity. Accordingly, the overall length of the lens system becomes longer. Furthermore, the position of the exit pupil varies largely, so that the change in the F-number undesirably becomes larger.

Condition (4) specifies the change in the distance between the first lens group 10 and the second lens group 20.

If (d2t−d2w)/(ft−fw) exceeds the upper limit of condition (4), the change in the distance between the first lens group 10 and the second lens group 20 becomes too large, so that the power balance over the first and second lens groups in order to maintain suitable optical performance is lost. As a result, fluctuations of aberrations due to zooming become larger.

If (d2t−d2w)/(ft−fw) exceeds the lower limit of condition (4), the contribution of the change in the distance between the first lens group 10 and the second lens group 20 to zooming becomes smaller, so that a necessary zoom ratio cannot be attained.

Condition (5) specifies the magnification of the fourth lens group 40.

If ft/ft$_{1\_3}$ exceeds the upper limit of condition (5), the focusing sensitivity upon focusing becomes too low, the traveling distance of the fourth lens group 40 as a focusing lens group has to be secured longer, which is disadvantageous for miniaturization of the lens system.

If ft/ft$_{1\_3}$ exceeds the lower limit of condition (5), the focusing sensitivity upon focusing becomes too high, the control of focusing operation becomes difficult.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, Fno designates the F-number, f designates the focal length of the entire zoom lens system, W designates the half angle-of-view (°), fB designates the back focal distance (i.e., from the image-side surface of the cover glass C to the image forming surface of the image pick-up device), r designates the radius of curvature, d designates the lens-element thickness or distance between lens elements, Nd designates the refractive index of the d-line, and ν designates the Abbe number.

In addition to the above, an aspherical surface which is symmetrical with respect to the optical axis is defined as follows:

$$x = cy^2/(1 + [1 - \{1+K\}c^2y^2]^{1/2}) + A4y^4 + A6y^6 + A8y^8 + A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIGS. 1 through 4 show the zoom lens system according to the first embodiment of the present invention. FIGS. 1 and 3 show the lens arrangement of the zoom lens system at the short focal length extremity and the long focal length extremity, respectively. FIGS. 2A through 2D, and FIGS. 4A through 4D show aberrations occurred respectively in the lens arrangement shown in FIGS. 1 and 3. Table 1 shows the numerical data of the first embodiment. The first lens group 10 includes a positive single biconvex lens element 11. The second lens group 20 includes a negative meniscus lens element 21 having the convex surface facing toward the object, a negative biconcave lens element 22, and a positive biconvex lens element 23, in this order from the object. The third lens group 30 includes a positive (biconvex) lens element 31 having a convex surface facing toward the object, cemented lens elements constituted by a positive (biconvex) lens element 32 having a convex surface facing toward the object and a negative (biconcave) lens element 33 having a concave surface facing toward the image, and cemented lens elements constituted by a positive (biconvex) lens element 34 having a convex surface facing toward the object and a negative (biconcave) lens element 35 having a concave surface facing toward the image, in this order from the object. The fourth lens group 40 includes a positive single biconvex lens element 41. The diaphragm S is provided 0.90 mm in front (on the object side) of the third lens group 30 (surface No. 9).

TABLE 1

$F_{NO} = 1:2.4 - 3.3 - 4.3$
$f = 8.10 - 17.50 - 28.76$
$W = 31.9 - 15.0 - 9.3$
$f_B = 0.00 - 0.00 - 0.00$

| Surf. No. | r | d | Nd | ν |
|---|---|---|---|---|
| 1 | 18.982 | 4.57 | 1.48749 | 70.2 |
| 2 | −334.408 | 1.20 − 6.34 − 7.66 | — | — |
| 3 | 49.230 | 1.00 | 1.83400 | 37.2 |
| 4 | 9.266 | 2.88 | — | — |
| 5 | −15.850 | 1.00 | 1.81600 | 46.6 |

TABLE 1-continued

| 6 | 23.775 | 3.16 | — | — |
|---|---|---|---|---|
| 7 | 36.320 | 2.07 | 1.80518 | 25.4 |
| 8 | −36.320 | 19.33 − 8.54 − 3.25 | — | — |
| 9 | 10.280 | 2.45 | 1.60311 | 60.7 |
| 10 | −367.965 | 0.21 | — | — |
| 11 | 9.035 | 2.60 | 1.58913 | 61.2 |
| 12 | −203.340 | 1.28 | 1.80518 | 25.4 |
| 13 | 9.718 | 1.72 | — | — |
| 14* | 11.848 | 2.10 | 1.58913 | 61.2 |
| 15 | −80.000 | 0.90 | 1.62230 | 53.2 |
| 16 | 8.072 | 4.88 − 11.50 − 20.09 | — | — |
| 17 | 15.060 | 2.95 | 1.48749 | 70.2 |
| 18 | −34.119 | 1.50 | — | — |
| 19 | ∞ | 2.00 | 1.51633 | 64.1 |
| 20 | ∞ | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 14 | 0.00 | −0.64312 × 10⁻³ | −0.11783 × 10⁻⁴ | −0.16380 × 10⁻⁶ |

[Embodiment 2]

Figure 7:
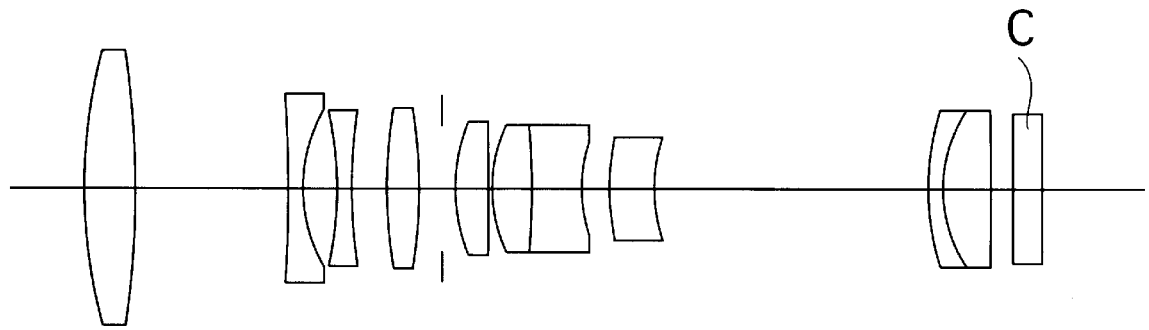
FIG. 7 shows the lens arrangement of the zoom lens system at the long focal length extremity, according to the second embodiment of the present invention.
Figure 8A:
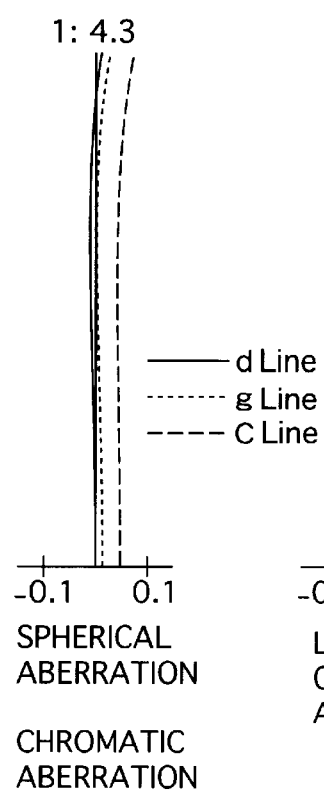
FIGS. 8A, 8B, 8C and 8D show aberrations occurred in the lens arrangement shown in FIG. 7.
Figure 8B:
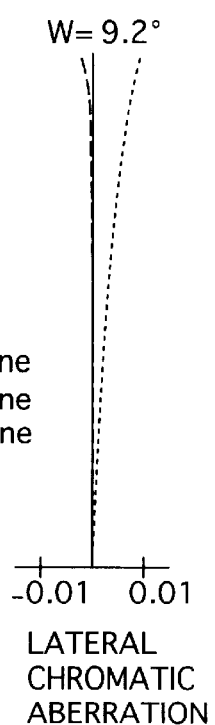
Figure 8C:
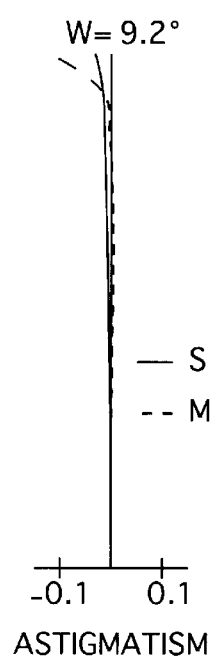
Figure 8D:
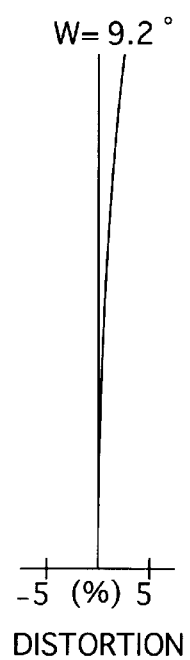

FIGS. 5 through 8 show the zoom lens system according to the second embodiment of the present invention. FIGS. 5 and 7 show the lens arrangement of the zoom lens system at the short focal length extremity and the long focal length extremity, respectively. FIGS. 6A through 6D, and FIGS. 8A through 8D show aberrations occurred respectively in the lens arrangement shown in FIGS. 5 and 7. Table 2 shows the numerical data of the second embodiment. The basic lens arrangement is the same as the first embodiment except the following:

(i) the most object-side lens element 21 of the second lens group 20 is a biconcave lens element;

(ii) the third lens group 30 includes a positive lens element 31 having a convex surface facing toward the object, cemented lens elements constituted by a positive lens element 32 having a convex surface facing toward the object and a negative lens element 33 having a concave surface facing toward the image, and a negative meniscus lens element 36 having the convex surface facing toward the object, in this order from the object; and (iii) the fourth lens group 40 includes cemented lens elements constituted by a negative meniscus lens element 42 having the convex surface facing toward the object and a positive lens element 43 having a convex surface facing toward the object.

The diaphragm S is provided 0.90 mm in front (on the object side) of the third lens group 30 (surface No. 9).

TABLE 2

$F_{NO} = 1:2.4 - 3.4 - 4.3$
$f = 8.10 - 18.20 - 28.76$
$W = 31.9 - 14.3 - 9.2$
$f_B = 0.00 - 0.00 - 0.00$

| Surf. No. | r | d | Nd | ν |
|---|---|---|---|---|
| 1 | 35.643 | 3.44 | 1.48749 | 70.2 |
| 2 | −65.415 | 1.50 − 8.29 − 10.41 | — | — |

TABLE 2-continued

| | | | | |
|---|---|---|---|---|
| 3 | −98.930 | 1.00 | 1.83481 | 42.7 |
| 4 | 10.610 | 2.33 | — | — |
| 5 | −24.066 | 1.00 | 1.83481 | 42.7 |
| 6 | 35.348 | 2.38 | — | — |
| 7 | 32.636 | 2.18 | 1.80518 | 25.4 |
| 8 | −34.130 | 20.10 − 7.48 − 2.45 | — | — |
| 9 | 11.980 | 2.25 | 1.62041 | 60.3 |
| 10 | −361.657 | 0.25 | — | — |
| 11 | 10.143 | 2.70 | 1.58913 | 61.2 |
| 12 | −51.515 | 3.40 | 1.80518 | 25.4 |
| 13 | 9.910 | 1.88 | — | — |
| 14* | 13.132 | 3.09 | 1.58913 | 61.2 |
| 15 | 10.771 | 3.22 − 10.78 − 18.55 | — | — |
| 16 | 17.474 | 1.00 | 1.48749 | 70.2 |
| 17 | 9.530 | 3.27 | 1.60311 | 60.7 |
| 18 | −306.480 | 1.50 | — | — |
| 19 | ∞ | 2.00 | 1.51633 | 64.1 |
| 20 | ∞ | — | — | — |

*designates the aspherical surface which is rotationally symmetrical with respect to the optical axis.

Aspherical surface data (the aspherical surface coefficients not indicated are zero (0.00):

| Surf. No. | K | A4 | A6 | A8 |
|---|---|---|---|---|
| 14 | 0.00 | $-0.54514 \times 10^{-3}$ | $-0.10121 \times 10^{-4}$ | $-0.10310 \times 10^{-6}$ |

[Embodiment 3]

FIGS. 9 through 12 show the zoom lens system according to the third embodiment of the present invention. FIGS. 9 and 11 show the lens arrangement of the zoom lens system at the short focal length extremity and the long focal length extremity, respectively. FIGS. 10A through 10D, and FIGS. 12A through 12D show aberrations occurred respectively in the lens arrangement shown in FIGS. 9 and 11. Table 3 shows the numerical data of the third embodiment. The basic lens arrangement is the same as the first embodiment except that the most object-side lens element 21 of the second lens group 20 is a biconcave lens element.

The diaphragm S is provided 0.93 mm in front (on the object side) of the third lens group 30 (surface No. 9).

TABLE 3

$F_{NO} = 1:2.5 − 3.3 − 4.5$
$f = 8.10 − 18.40 − 28.75$
$W = 31.9 − 14.2 − 9.4$
$f_B = 0.00 − 0.00 − 0.00$

| Surf. No. | r | d | Nd | ν |
|---|---|---|---|---|
| 1 | 40.606 | 3.49 | 1.48749 | 70.2 |
| 2 | −60.411 | 2.00 − 8.49 − 9.92 | — | — |
| 3 | −52.275 | 1.00 | 1.83481 | 42.7 |
| 4 | 11.056 | 2.23 | — | — |
| 5 | −25.361 | 1.00 | 1.83481 | 42.7 |
| 6 | 72.689 | 2.78 | — | — |
| 7 | 34.413 | 2.04 | 1.80518 | 25.4 |
| 8 | −44.443 | 20.57 − 7.40 − 2.48 | — | — |
| 9 | 14.353 | 2.05 | 1.69680 | 55.5 |
| 10 | −122.498 | 0.10 | — | — |
| 11 | 10.626 | 2.70 | 1.60311 | 60.7 |
| 12 | −43.930 | 3.55 | 1.80518 | 25.4 |
| 13 | 11.568 | 2.97 | — | — |
| 14* | 13.464 | 2.05 | 1.58913 | 61.2 |
| 15 | −414.000 | 1.00 | 1.61772 | 49.8 |
| 16 | 8.834 | 2.83 − 10.23 − 18.02 | — | — |
| 17* | 20.393 | 2.40 | 1.58913 | 61.2 |

TABLE 3-continued

| | | | | |
|---|---|---|---|---|
| 18 | −36.803 | 1.81 | — | — |
| 19 | ∞ | 2.00 | 1.51633 | 64.1 |
| 20 | ∞ | — | — | — |

*designates the aspherical surface which is rotationally symmetrical with respect to the optical axis.

Aspherical surface data (the aspherical surface coefficients not indicated are zero (0.00):

| Surf. No. | K | A4 | A6 | A8 |
|---|---|---|---|---|
| 14 | 0.00 | $-0.52491 \times 10^{-3}$ | $-0.87439 \times 10^{-5}$ | $-0.40277 \times 10^{-7}$ |
| 17 | 0.00 | $0.59492 \times 10^{-4}$ | $-0.29752 \times 10^{-6}$ | $0.71328 \times 10^{-8}$ |

[Embodiment 4]

FIGS. 13 through 16 show the zoom lens system according to the fourth embodiment of the present invention. FIGS. 13 and 15 show the lens arrangement of the zoom lens system at the short focal length extremity and the long focal length extremity, respectively. FIGS. 14A through 14D, and FIGS. 16A through 16D show aberrations occurred respectively in the lens arrangement shown in FIGS. 13 and 15. Table 4 shows the numerical data of the fourth embodiment. The basic lens arrangement is the same as the first embodiment except the following:

(i) the most object-side lens element 21 of the second lens group 20 is a biconcave lens element; and (ii) the lens arrangement of the third lens group 30 is the same as that of the second embodiment.

The diaphragm S is provided 0.90 mm in front (on the object side) of the third lens group 30 (surface No. 9).

TABLE 4

$F_{NO} = 1:2.5 − 3.4 − 4.7$
$f = 7.90 − 17.00 − 28.84$
$W = 31.7 − 14.9 − 9.1$
$f_B = 0.00 − 0.01 − 0.00$

| Surf. No. | r | d | Nd | ν |
|---|---|---|---|---|
| 1 | 46.519 | 3.53 | 1.48749 | 70.2 |
| 2 | −62.636 | 2.59 − 8.06 − 9.36 | — | — |
| 3 | −42.571 | 1.00 | 1.83481 | 42.7 |
| 4 | 12.310 | 1.94 | — | — |
| 5 | −37.949 | 1.00 | 1.80400 | 46.6 |
| 6 | 25.808 | 2.12 | — | — |
| 7 | 25.213 | 2.18 | 1.80518 | 25.4 |
| 8 | −51.563 | 20.93 − 8.27 − 2.66 | — | — |
| 9 | 14.393 | 1.99 | 1.65160 | 58.5 |
| 10 | −78.019 | 0.64 | — | — |
| 11 | 9.487 | 3.43 | 1.58913 | 61.2 |
| 12 | −32.644 | 4.13 | 1.80518 | 25.4 |
| 13 | 9.200 | 1.70 | — | — |
| 14* | 11.263 | 1.77 | 1.58913 | 61.2 |
| 15 | 9.781 | 3.38 − 10.00 − 19.09 | — | — |
| 16 | 82.360 | 2.14 | 1.64769 | 33.8 |
| 17 | −17.715 | 3.50 | — | — |
| 18 | ∞ | 2.00 | 1.51633 | 64.1 |
| 19 | ∞ | — | — | — |

*designates the aspherical surface which is rotationally symmetrical with respect to the optical axis.

Aspherical surface data (the aspherical surface coefficients not indicated are zero (0.00):

TABLE 5

|          | Embod. 1 | Embod. 2 | Embod. 3 | Embod. 4 |
|----------|----------|----------|----------|----------|
| Cond. (1) | 0.219 | 0.169 | 0.161 | 0.143 |
| Cond. (2) | 0.371 | 0.337 | 0.358 | 0.348 |
| Cond. (3) | 0.736 | 0.742 | 0.735 | 0.750 |
| Cond. (4) | 0.313 | 0.431 | 0.383 | 0.324 |
| Cond. (5) | 0.696 | 0.700 | 0.730 | 0.778 |

Each condition of each embodiment is shown in the following Table 5.

| Surf. No. | K | A4 | A6 | A8 |
|-----------|---|----|----|----|
| 14 | 0.00 | $-0.71354 \times 10^{-3}$ | $-0.10653 \times 10^{-4}$ | $-0.34551 \times 10^{-6}$ |

As can be understood from Table 5, the numerical values of the first through fourth embodiments satisfy each of conditions (1) through (5). Furthermore, as can be understood from the aberration diagrams, aberrations are adequately corrected.

As can be understood from the above description, a miniaturized and high-performance four-lens-group zoom lens system for a digital still camera or a video camera, in which a zoom ratio of about 3.6 is attained, and the size and the number of lens elements thereof are substantially the same as those of a three-lens-group zoom lens system, can be obtained.

What is claimed is:

1. A zoom lens system comprising a positive first lens group, a negative second lens group, a positive third lens group, and a positive fourth lens group, in this order from an object;

wherein upon zooming from the short focal length extremity to the long focal length extremity, at least said first, second and third lens groups are moved so that the distance between said first lens group and said second lens group increases, the distance between said second lens group and said third lens group decreases, and the distance between said third lens group and said fourth lens group increases;

wherein said lens system satisfies the following conditions:

$0.10 < fw/f1 < 0.30$ $0.25 < fw/f4 < 0.45$ $0.60 < X3/(ft-fw) < 0.85$ wherein
   fw designates the focal length of the entire zoom lens system at the short focal length extremity;
   ft designates the focal length of the entire zoom lens system at the long focal length extremity;
   fi designates the focal length of the $i^{th}$ lens group (i=1 to 4); and
   X3 designates the traveling distance of said third lens group from the short focal length extremity to the long focal length extremity.

2. The zoom lens system according to claim 1, wherein said first lens group comprises a positive single lens element, and said zoom lens system satisfies the following condition:

$0.20 < (d2t-d2w)/(ft-fw) < 0.50$ wherein
   d2w designates the distance between said first lens group and said second lens group at the short focal length extremity; and
   d2t designates the distance between said first lens group and said second lens group at the long focal length extremity.

3. The zoom lens system according to claim 1, wherein said fourth lens group comprises a positive single lens element.

4. The zoom lens system according to claim 1, wherein said fourth lens group comprises a focusing lens group, and said zoom lens system satisfies the following condition:

$0.6 < ft/ft_{1\_3} < 0.8$ wherein
   $ft_{1\_3}$ designates the focal lengths from said first lens group to said third lens group, at the long focal length extremity.

5. The zoom lens system according to claim 1, wherein said fourth lens group is made immovable upon zooming.

* * * * *